(12) United States Patent
Browne et al.

(10) Patent No.: US 11,920,551 B2
(45) Date of Patent: Mar. 5, 2024

(54) OSCILLATING TENSION WAVE ENERGY CONVERTER

(71) Applicant: University of Massachusetts, Boston, MA (US)

(72) Inventors: Gregory E. Browne, Bridgewater, MA (US); Christopher M. Meninno, Taunton, MA (US); William G Michaud, Stow, MA (US); Nicholas D. White, Berkley, MA (US); Daniel G. MacDonald, Mashpee, MA (US); Mehdi Raessi, North Dartmouth, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 17/996,262

(22) PCT Filed: Apr. 27, 2021

(86) PCT No.: PCT/US2021/029364
§ 371 (c)(1),
(2) Date: Oct. 14, 2022

(87) PCT Pub. No.: WO2021/222221
PCT Pub. Date: Nov. 4, 2021

(65) Prior Publication Data
US 2023/0220824 A1 Jul. 13, 2023

Related U.S. Application Data

(60) Provisional application No. 63/016,795, filed on Apr. 28, 2020.

(51) Int. Cl.
*F03B 13/18* (2006.01)
*F03B 13/16* (2006.01)

(52) U.S. Cl.
CPC .............. *F03B 13/18* (2013.01); *F03B 13/16* (2013.01)

(58) Field of Classification Search
CPC ...... F03B 13/18; F03B 13/16; F03B 13/1885; F05B 2260/502; F05B 2260/40311; Y02E 10/30
See application file for complete search history.

(56) References Cited

U.S. PATENT DOCUMENTS

| 5,929,531 A * | 7/1999 | Lagno .................. F03B 13/262 417/330 |
| 10,344,736 B2 * | 7/2019 | Abdelkhalik ........... F03B 13/16 |

(Continued)

FOREIGN PATENT DOCUMENTS

CN 103423071 A 12/2013

OTHER PUBLICATIONS

PCT Notification of Transmittal of the International Search Report and Written Opinion of the International Searching Authority, or the Declaration, dated Sep. 1, 2021.

*Primary Examiner* — Hoang M Nguyen
(74) *Attorney, Agent, or Firm* — Hinckley Allen & Snyder, LLP; Stephen Holmes

(57) ABSTRACT

A unique point absorber type wave energy conversion device is disclosed that includes a Power Take Off (PTO) which uses a torsion spring to return a vertical shaft to its original position after being rotated by a rope or cord that pulls a reel via a guide system. This spring return allows the PTO and housing to stay stationary under the wave energy while a buoy at the surface provides an oscillating linear movement. The oscillating rotary motion caused by the interaction of the buoy and spring is converted into a one directional motion via a one-way clutch and is transmitted to generators using a gearbox that increases rotational speed.

10 Claims, 13 Drawing Sheets

(56) References Cited

U.S. PATENT DOCUMENTS

| | | | |
|---|---|---|---|
| 2007/0126239 A1* | 6/2007 | Stewart | F03B 13/20 |
| | | | 290/53 |
| 2007/0228727 A1 | 10/2007 | Hirsch | |
| 2010/0025999 A1* | 2/2010 | Kim | F03B 13/14 |
| | | | 290/53 |
| 2012/0085089 A1 | 4/2012 | Kuo et al. | |
| 2017/0226984 A1 | 8/2017 | Gregory | |
| 2019/0010915 A1* | 1/2019 | MacDonald | F03B 13/20 |

* cited by examiner

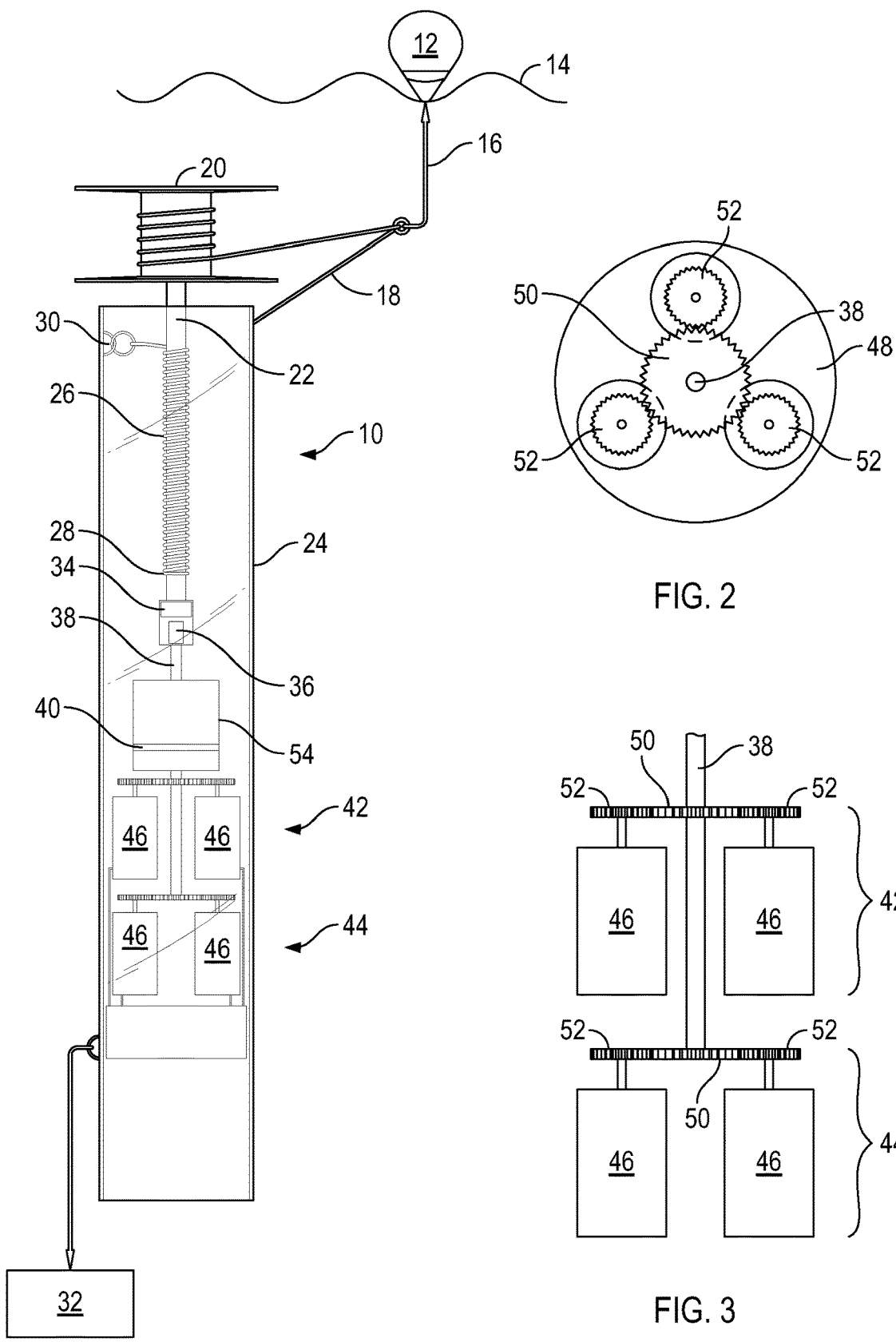
FIG. 2
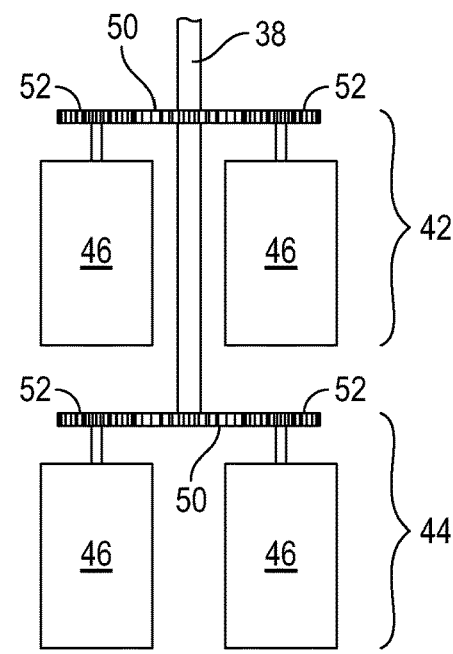
FIG. 3
FIG. 1

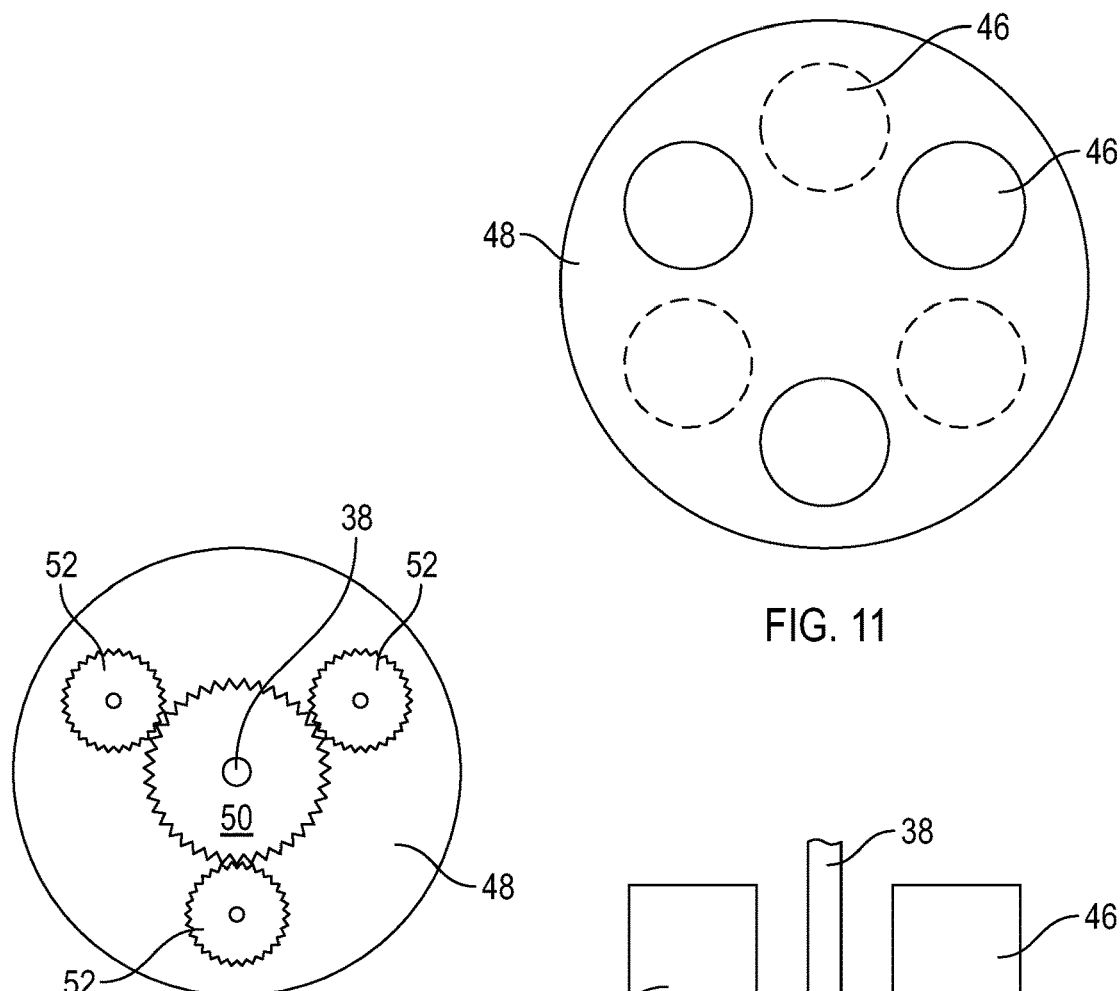
FIG. 11
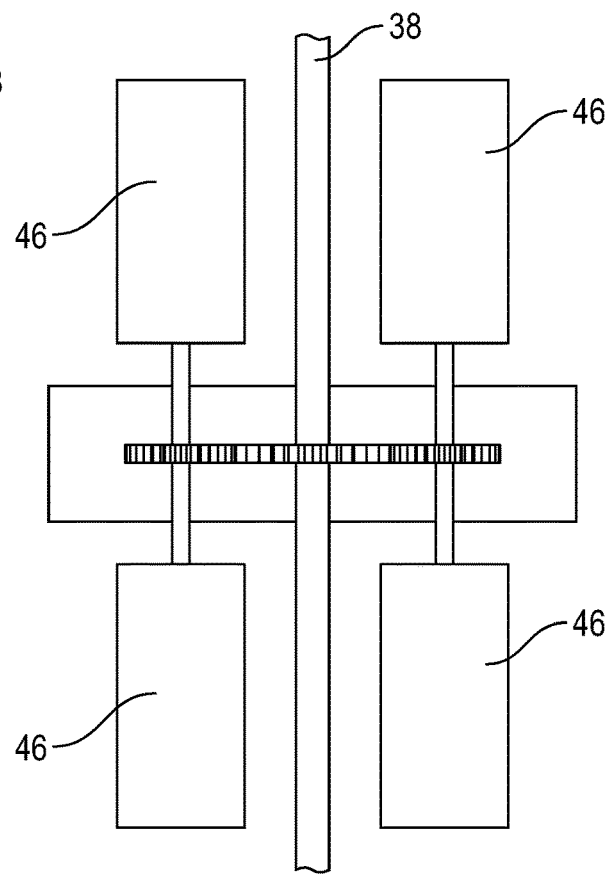
FIG. 12
FIG. 13

OSCILLATING TENSION WAVE ENERGY CONVERTER

BACKGROUND OF THE INVENTION

The present invention generally relates to devices for capturing energy from ocean waves and more particularly to an oscillating tension wave energy conversion device for use in a tethered or moored type installation known as a point absorber design.

A variety of technologies have been proposed to capture energy from ocean waves. The wave energy conversion (WEC) technology that exists today is primarily in the research and development stage, and the state of the technology is commonly considered to be one to two decades behind the development of wind energy. Although wave energy research has been ongoing for the past several decades, primarily in the United Kingdom, wave energy research has lagged significantly behind wind energy due to funding and other political constraints. At the present time, there are very few commercially viable WEC's on the market.

There are many approaches to wave energy conversion currently being tested in research facilities around the world. In general, these can be separated into several broad classes of devices:

Oscillating Water Columns—these devices utilize an enclosed box with its bottom open to the ocean. Water entering the box associated with the crest of the wave pushes air out through a small conduit, which is used to drive a turbine which in turn produces electricity. As the wave recedes, air is drawn into the box through the same (or a separate) conduit, again driving a turbine to produce electricity.

Overtopping Devices—these devices allow incoming waves to break over the top edge of the device leaving water trapped in a small reservoir. As the water drains, it turns a turbine, creating electricity.

Point Absorbers—these are moored devices, or buoys, that move up and down on the water surface. There are several methods of converting the up and down motion of the point absorber to electricity, but all point absorbers work by exploiting the motion of the wave relative to a fixed, or minimally moving, reference frame. In some cases, the point absorber might be attached to a rigid structure, such as a pier or breakwater in the coastal zone, resulting in relative motion between the wave and the fixed infrastructure. In open waters, a point absorber must operate by exploiting the relative motion between the ocean surface, and relatively calm deeper waters. Motion associated with a wave decreases exponentially away from the surface, with a layer of no motion generally reached at a depth equal to approximately one half the horizontal wavelength.

Oscillating Wave Surge Converters—these can be thought of us submerged flappers that move back and forth as a wave passes. This flapping motion is then converted to electricity through a variety of methods. Sometimes the motion is used to pump seawater to shore where the electrical generation process takes place.

Submerged Pressure Differential Devices—like surge converters, these devices use pressure differences on the seafloor as a wave passes to pump the seawater which, in turn, is then used to drive a turbine.

Attenuators—these devices float at the surface with several joints. As the device flexes due to surface wave action, pistons within the joints drive high pressure oil through hydraulic motors which then drive turbines to produce electricity.

BRIEF SUMMARY OF THE INVENTION

In this regard, the present disclosure describes a unique point absorber type wave energy conversion device including a Power Take Off (PTO) that uses a torsion spring to return a vertical shaft to its original position after being rotated by a rope or cord that pulls a reel via a guide system. This spring return allows the PTO and housing to stay stationary under the wave energy while a buoy at the surface provides an oscillating linear movement. The oscillating rotary motion caused by the interaction of the buoy and spring is converted into a one directional motion via a one-way clutch and transmitted to generators using a gearbox the increases speed. This is an enabling technology that could benefit many different point absorber designs.

The present disclosure provides a novel point absorber type wave energy conversion device that captures two directional linear motion and converts it to a single directional rotational energy that in turn is used to turn electrical generator sets to produce electrical energy. Embodiments of the disclosure describe various arrangements of tension cables, spring return systems, one-way clutches, planetary gearing systems and generator set arrangements in multiple configurations to provide a platform for stable and efficient point absorber wave energy conversion.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIG. 1 is a side cutaway view of a point absorber wave energy conversion device in accordance with one embodiment of the present disclosure;

FIG. 2 is a view of a gearbox to drive multiple generator sets from a single rotational shaft;

FIG. 3 is a side view of one embodiment of a generator set of the present disclosure;

FIG. 11 is a schematic view of the arrangement of generator sets in accordance with one embodiment of the disclosure;

FIG. 12 is a top view of drive gears for the driving of generator sets in accordance with one embodiment of the disclosure;

FIG. 13 is a side view of a drive arrangement for the driving of generator sets in accordance with one embodiment of the disclosure;

DETAILED DESCRIPTION OF THE EXEMPLARY EMBODIMENTS

Figure 4:
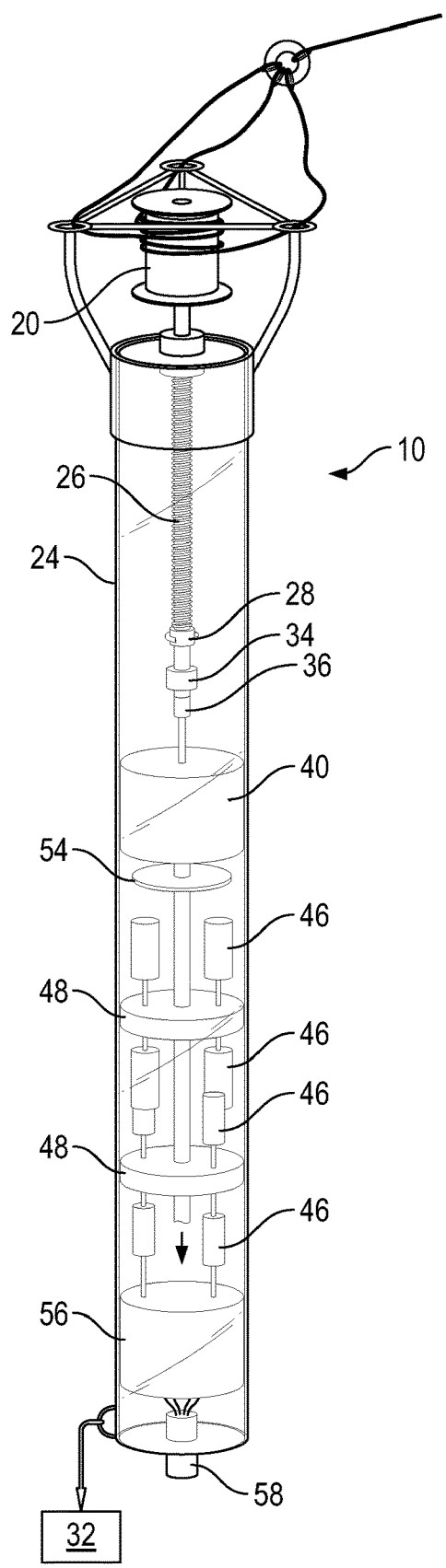
FIG. 4 is a side cutaway view of a point absorber wave energy conversion device in accordance with an alternate embodiment of the present disclosure.

Now referring to the drawings, a unique point absorber type wave energy conversion device is shown and generally illustrated in the figures. Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Parts and components are labeled throughout the drawing figures for clarity. Turning now to FIG. 1, the present disclosure generally describes a unique point absorber type wave energy conversion device 10 that takes the oscillating, rising and falling, motion of waves, captured by a buoy 12 at the moving surface 14 of the water, and translates it via a line 16 (cord or rope) through a guide system 18 to cause a spool/reel 20 to rotate with large torque but nearly no radial forces. This rotation is then translated via a first drive shaft 22 through a watertight bearing into a Power Take Off (PTO) housing 24. A torsion spring 26, connected at one end 28 to the first drive shaft 22 and at the other end 30 to the housing 24, captures a small amount of energy as the buoy 12 rises on a wave and uses that captured energy to wind the torsion spring 26 such that the torsion spring 26 causes the first drive shaft 22 to return to its original position. This allows the PTO to stay at a relatively constant depth. This constant depth is helped by either an anchor 32 in the form of a mooring system, spar, or tethered ballast connected at the bottom of the housing 24. The buoy 12 and tethered ballast 32 are best shown in the later embodiment illustrated in FIGS. 15-16.

Now viewing FIGS. 1-3, the oscillating rotary motion induced by the tension of the cord 16 on the reel 20 as the wave rises and the recoiling of the cord 16 by the torsion spring 26 as the wave falls is imparted to the first drive shaft 22. This bi-directional rotation is in turn converted into unidirectional rotary motion through the use of a clutch 34 and a one-directional bearing 36. In this manner as the first drive shaft 22 is driven in a first direction by the force of the wave causing the buoy 12 to pull on the cord 16 and impart rotation to the reel 22, such first directional rotation is transferred through the clutch 34 and transferred by the one directional bearing 36 into second drive shaft 38. When the first drive shaft 22 is driven in a second, opposing direction by the force of the torsion spring 26 causing the first drive shaft 22 to retract the cord 16 onto the reel 22, such second directional rotation causes the one directional bearing 36 to prevent rotation in the second direction from being transferred into the second drive shaft 38. As can be further seen, a planetary gearbox 40 including a flywheel 54 may be provided to impart an increase in the rotational speed of the second driveshaft to improve the ability of the device to turn the generators as will be described below. It should be noted that the illustrated embodiments of the housing 24 and various components are based on a cylindrical design. However, it should be understood that other geometric designs are also possible including at least a design based on a square cross-sectional tubular design. Such a square tube design would facilitate locking of the various components against counterrotation.

In one embodiment a single generator or at least one generator may be coupled to the second drive shaft 38. As illustrated in the figures two generator sets 42, 44 are shown that each include a plurality of generators 46 affixed on a mounting plate 48. The unidirectional rotary motion from second drive shaft 38 is split after the gearbox 40 by power splitting gearboxes utilizing a drive gear 50 on the second drive shaft 38 and corresponding drive gears 52 mounted on the generators 46 and coupled with the primary drive gear 50. A plurality of generators may be coupled with each power splitting gearbox.

Turning to FIG. 4, in one embodiment, a flywheel 54 is positioned after a second one directional bearing and clutch arrangement positioned after the planetary gearbox 40 and before the power splitting gearbox on the first generator set 42 to smooth the rotational motion transferred to the generators while the slip clutch 34 positioned prior to the speed increasing gearbox 40 provides over torque protection. The generators 46 provide power which is stored in batteries 56 within the housing 24. The energy stored within the batteries 56 can be transferred or used to charge devices through a wet mate connection 58 at the base of the housing 24.

In general, the use of a rope/cord 16 in this manner is not typically effective, because, while it transfers linear force cord 16 is in tension, it cannot transmit force when the cord 16 is unloaded or subject to compression. As a result, relative motion cannot be accomplished as between the cord 16 and the point absorber device 10 on the downstroke of the wave. Even worse, the downstroke motion would introduce slack into the cord 16, which would then have to be extended on the following upstroke before any tension could be accomplished, potentially eliminating a significant portion of the wave cycle where relative motion could be generated. The use of torsion spring 26 causes the rope or cord 16 to be in constant tension, miniscule amounts while the buoy 12 is in the trough of the wave and relatively large tension forces while the buoy 12 is being lifted to the crest of the wave. Thus, power is only harvested during the upstroke of the wave while the torsion spring 26 serves to retract the cord 16 onto the reel 20 after the buoy 12 passes over the crest of the wave.

As described the system may include a plurality of vertically integrated generator banks. By utilizing a plurality of small generators instead of a single heavy generator, the design includes redundancy while being easily deployable and allowing for customization to fit the specific needs for deployment. This allows for multiple generator sets to be added with no increase to the PTO's added mass. Since the entire housing is under water, the buoyancy can be balanced by adding empty length to the housing or adding weight (most likely in the form of flywheels or extra batteries), so adding extra generator sets does not negatively affect performance. Similarly, the reduced weight of the multiple smaller generators prevents the need for a heavy spar for deployment. Only using a rope or cord to connect to the surface buoy also reduces weight and allows for easy deployment. Point absorbers with heavy spar systems are costly to deploy because of necessary crane vessels. In fact, these costs often comprise a significant majority of the costs associated with point absorber power production. Using the tethered ballast in conjunction with this would increase cost savings even more.

Figure 5:
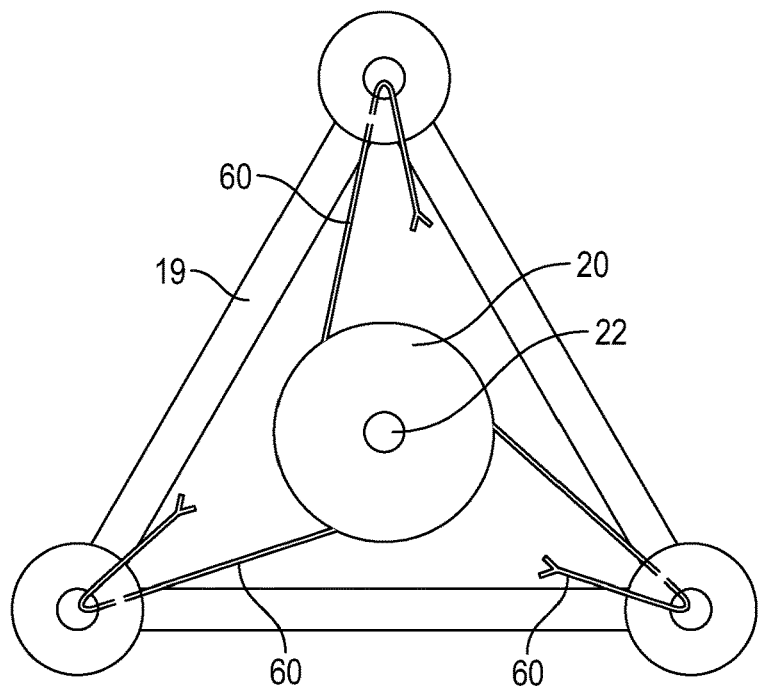
FIG. 5 is a top view of a cable interface in accordance with one embodiment of the disclosure.
Figure 6:
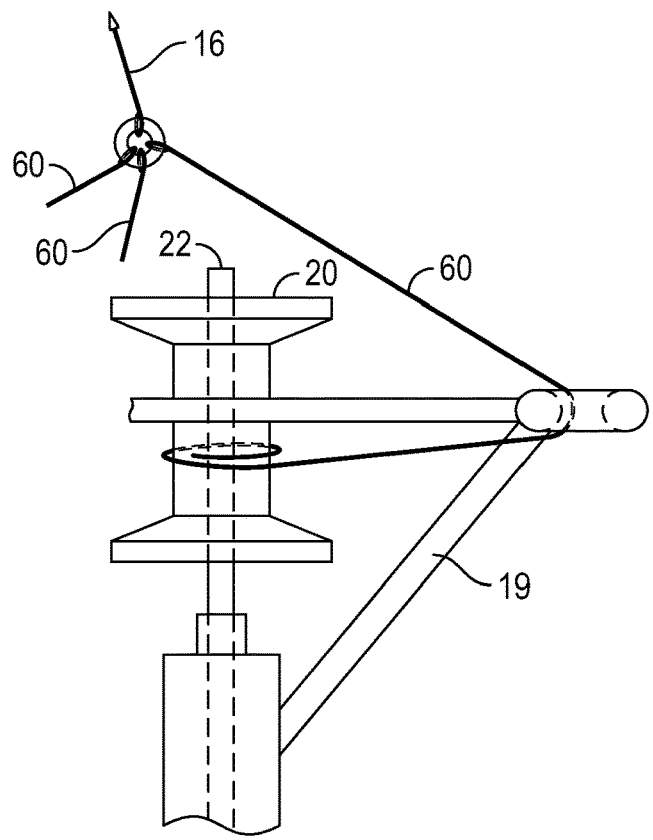
FIG. 6 is a side view of a cable interface in accordance with one embodiment of the disclosure.

As shown at FIGS. 5 and 6, the cord 16 may be connected to a yoke formed of additional cords 60 that are routed through a multi cord guide 19 that allows several cords to directly impart rotational energy to the reel 22 and first drive shaft 22 while ensuring the can be drawn and rewound on the reel 20 smoothly.

Figure 7:
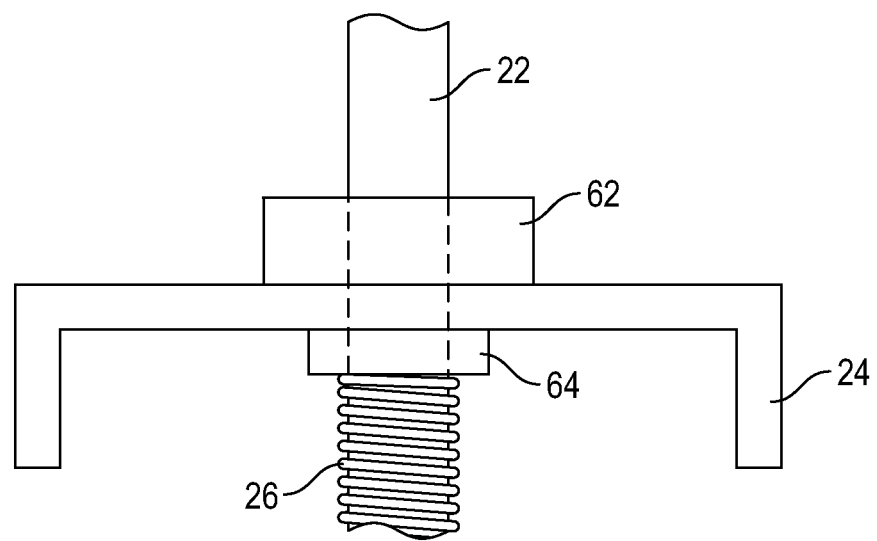
FIG. 7 is a sectional view through the top of the housing in accordance with one embodiment of the disclosure.
Figure 8:
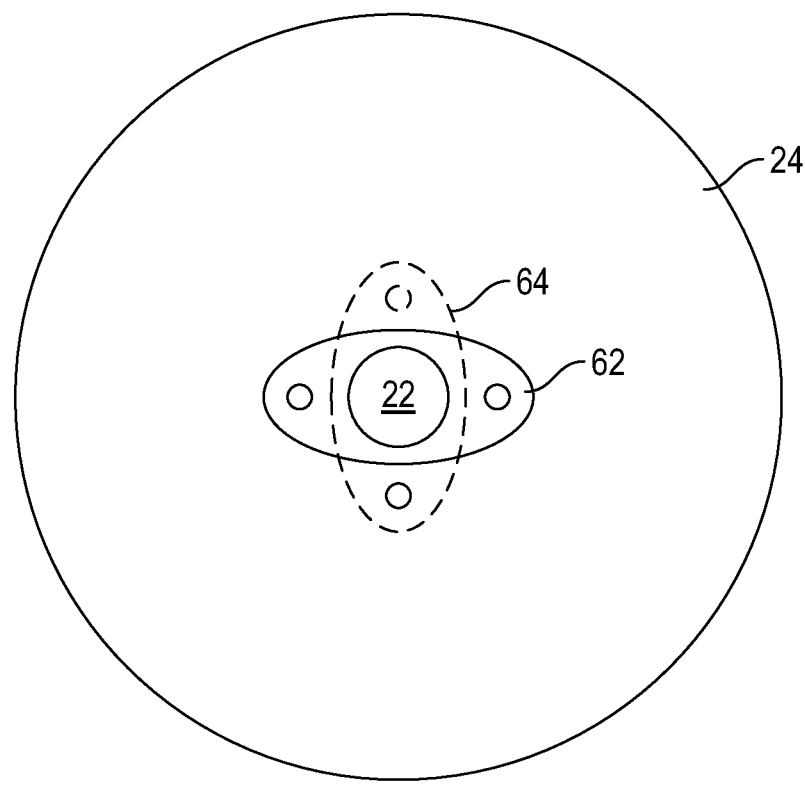
FIG. 8 is a top view of the top of the housing in accordance with one embodiment of the disclosure.
Figures 9, 10:
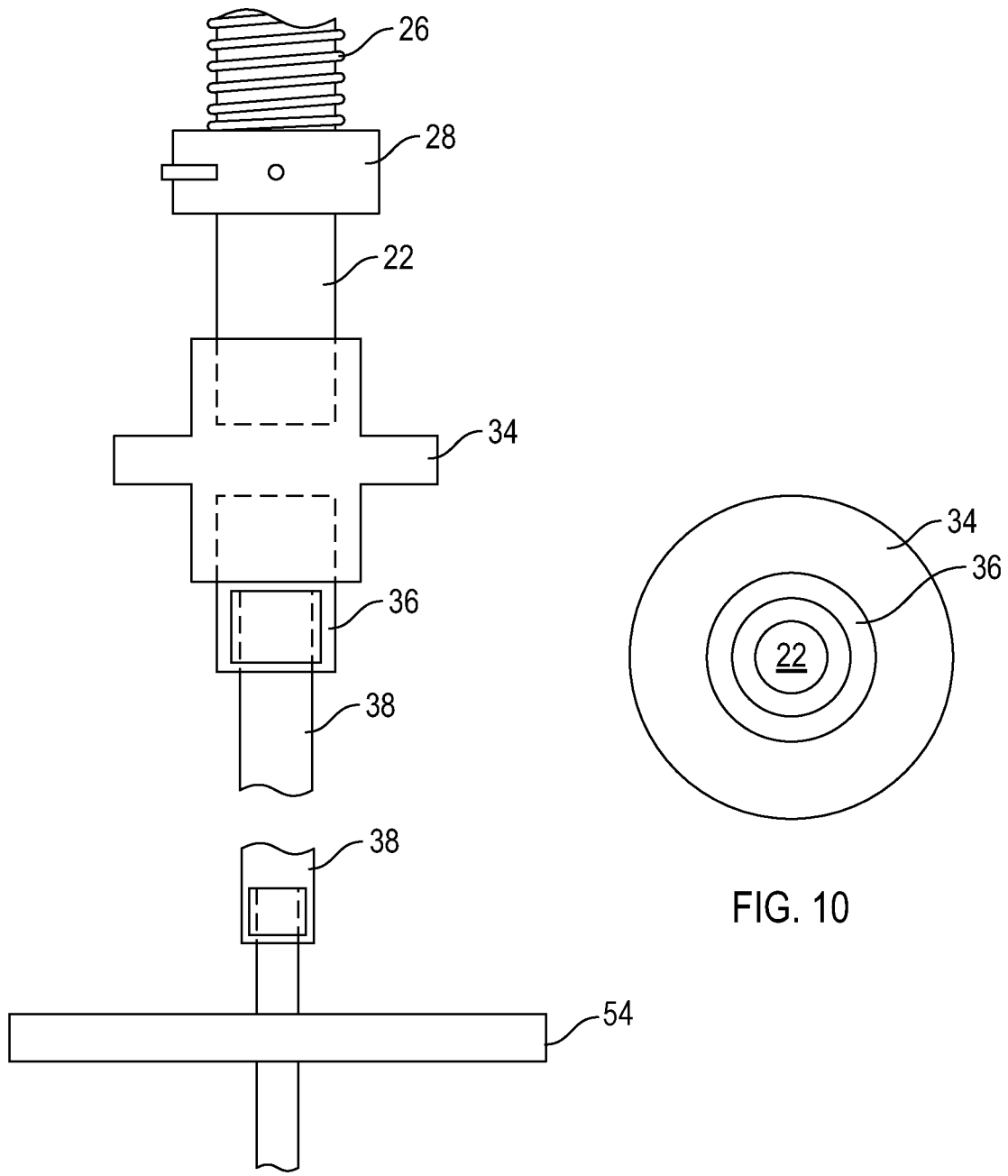
FIG. 9 is a side view showing the clutch and one way bearing of the drive shaft in accordance with one embodiment of the disclosure.
FIG. 10 is a top view of the clutch and one way bearing of the drive shaft in accordance with one embodiment of the disclosure.
Figure 14:
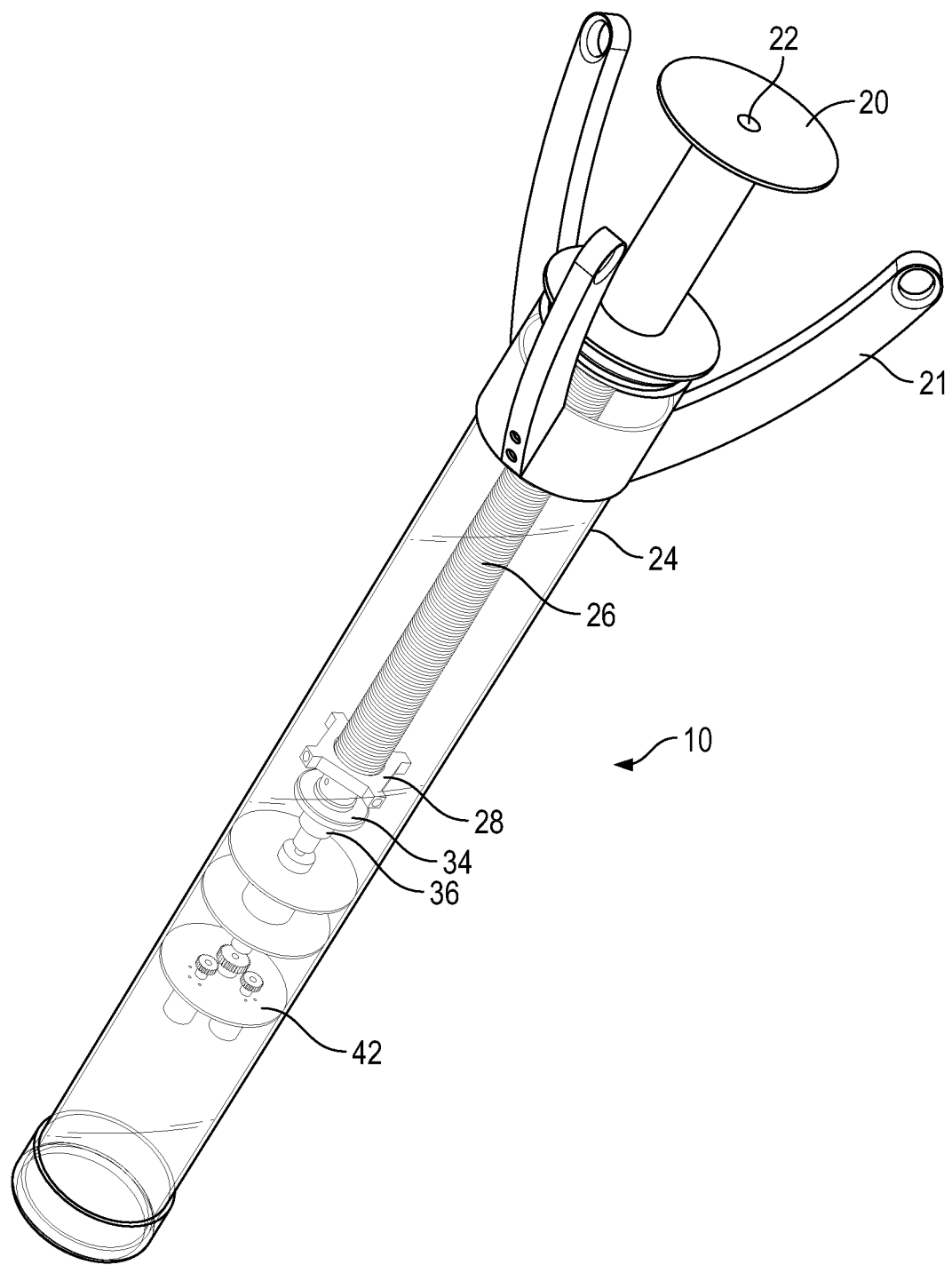
FIG. 14 is a side cutaway view of a point absorber wave energy conversion device in accordance with an alternate embodiment of the present disclosure.

FIGS. 7 and 8 are illustrative embodiments of the top of the housing 24 where the first drive shaft 22 can be seen passing through a watertight bearing 62 affixed to the housing. Further, an attachment point 64, can be seen on the inside of the housing as a means for engaging one end of the torsion spring 26. While FIGS. 9 and 10 provides a detailed relationship between the torsion spring 26 and the lower attachment point between the torsion spring and the first drive shaft 22. Clutch 34 then transmits force to the one way bearing 34 that then imparts one way rotation into the second drive shaft 38.

FIGS. 11, 12 and 13 illustrate possible arrangements of the generators 46 either above, below or in both position relative to the mounting ring 48 such that each generator set may include a plurality of small integrated generators 46. This further demonstrates the scalability and modularity of the system overall.

As discussed above, the system includes a vertically integrated torsion spring 26. The length of the torsion spring 26 can be changed to accommodate predicted wave heights for the deployed location without contributing to the added mass of the device. This also allows the torsion spring length to be increased to the point where its' endurance stress is minimized, thus leading to a maximum spring life.

The submersion depth of the system is also highly customizable. The PTO is attached to the drag device 32 at the bottom by a rope or cord and at the top by a rope or cord. These rope/cords can be of any length, and if they are non-elastic the device will remain functional. This could mean that the PTO could be kept near the surface for energy needed near the surface or kept below the energy of the wave to allow for easy docking of underwater vehicles or kept even further down so that vehicles do not have to travel far to recharge. Obviously going very far down would require heavier and stronger materials to withstand the pressures of the ocean, but forjust below the energy of the wave it would require no specialized materials. Using a conventional spar system, increasing the penetration depth is extremely costly due to the increased costs for construction and deployment, so using the tethered ballast with this design will help reduce costs even more significantly.

The system is modular in design. With the ability to customize how many generator banks, how deep the device sits in the water, and how big of a wave size it can capture, all without changing the nature of how the device functions this means that any customer who wants any amount of power at sea can benefit from this device. From small vessels wanting to run electronics on their boats without wasting gas, to yachts and large science vessels looking to provide power overnight when their solar panels don't work, or to remote vehicles that are wanted on station for up to a year without maintenance. This could help all of them.

Figure 15:
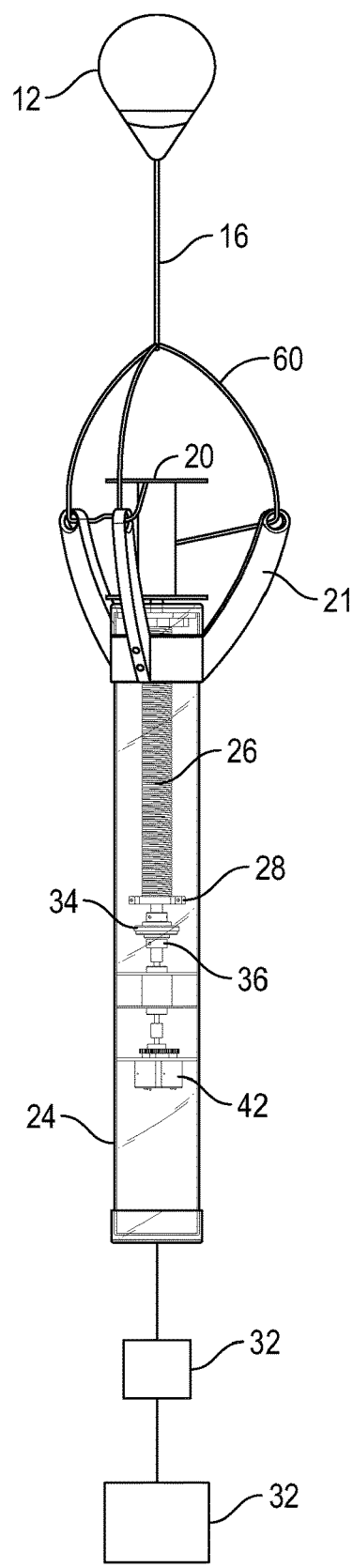
FIG. 15 is a side cutaway view of the point absorber wave energy conversion system in operation in accordance with an alternate embodiment of the present disclosure.
Figure 16:
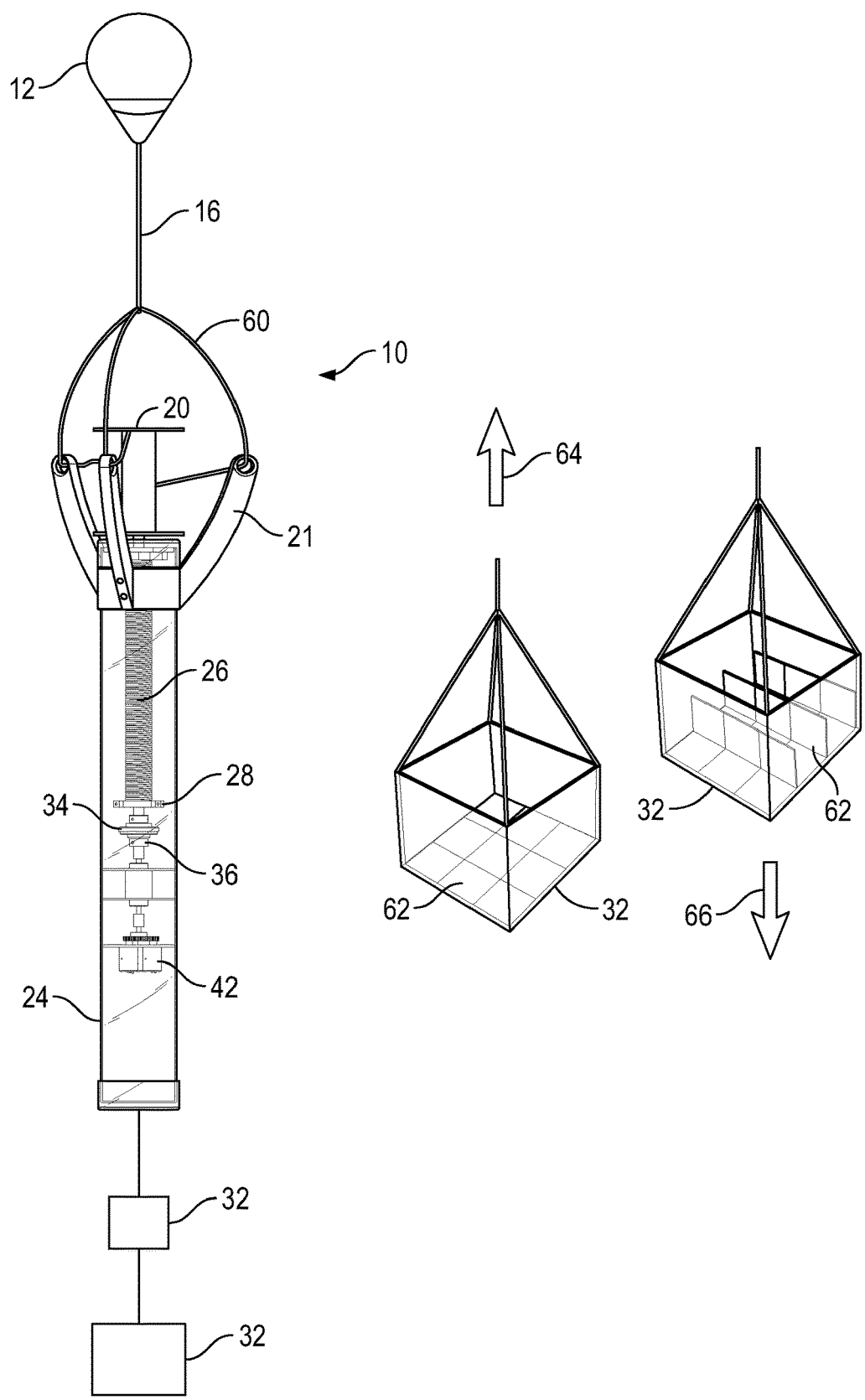
FIG. 16 is an illustration of anchoring tethers in accordance with an alternate embodiment of the present disclosure.
Figure 17:
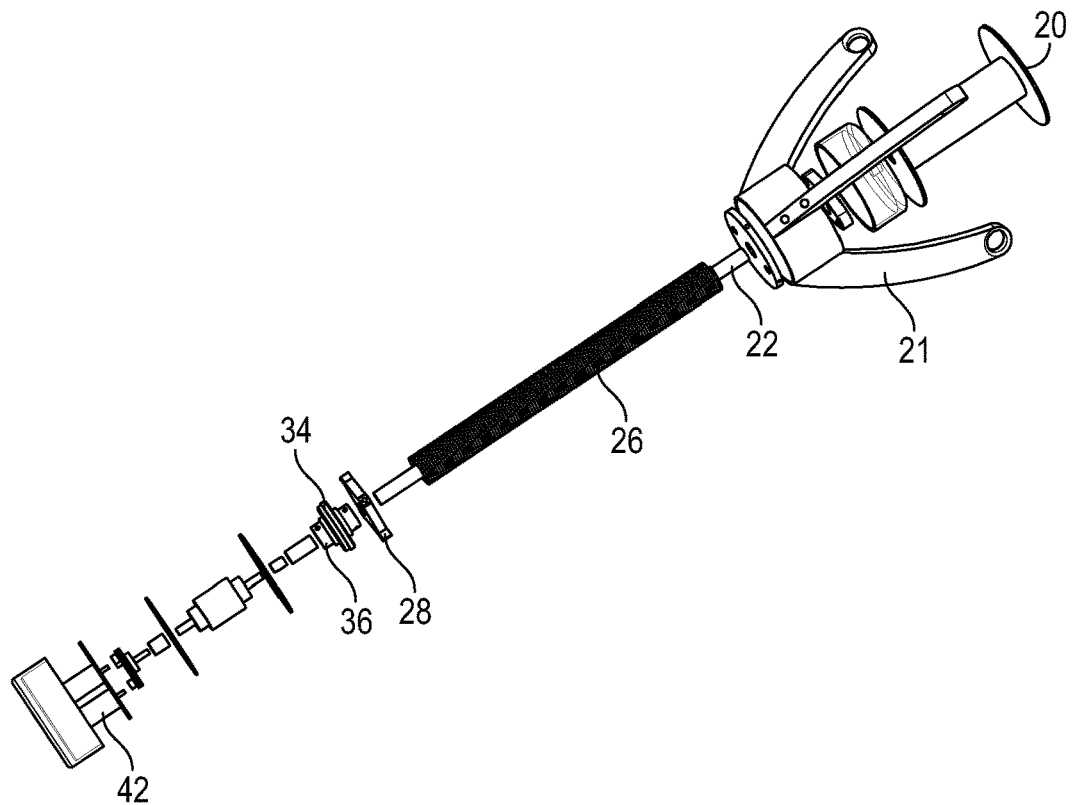
FIG. 17 is an exploded cutaway view of a point absorber wave energy conversion device in accordance with an alternate embodiment of the present disclosure.
Figure 18:
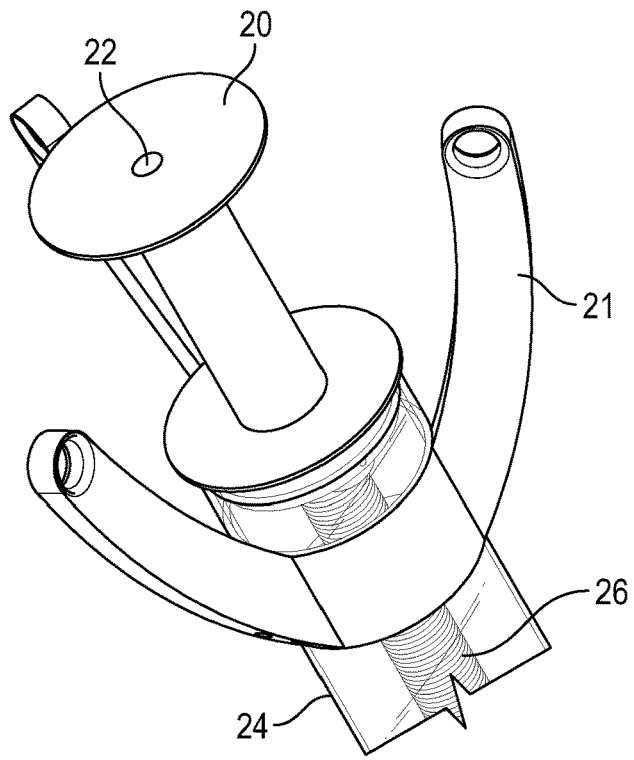
FIG. 18 is a side view of a cable interface in accordance with one embodiment of the disclosure.

Turning now to FIGS. 14-19, an alternate exemplary system is illustrated with an improved guide system 21 for directing winding and unwinding of the tension cords 60 on the spring-loaded supply reel 20. All other components of the system are generally the same. The buoy 20, guide 21 and tension cord 60 assemblies are best illustrated in FIGS. 15-16 along with the tethered ballast system 32 secured at the lower end. The tethered ballast system 32 as shown in FIG. 16 includes a hinged door 62 design in which the doors 62 close to create resistance against the water flow 64 and slow upward movement of the system, but open to allow free flow of water 66 during downward movement. FIG. 18 best illustrates the guide system 21 and supply/take-up reel 20.

Figure 19:
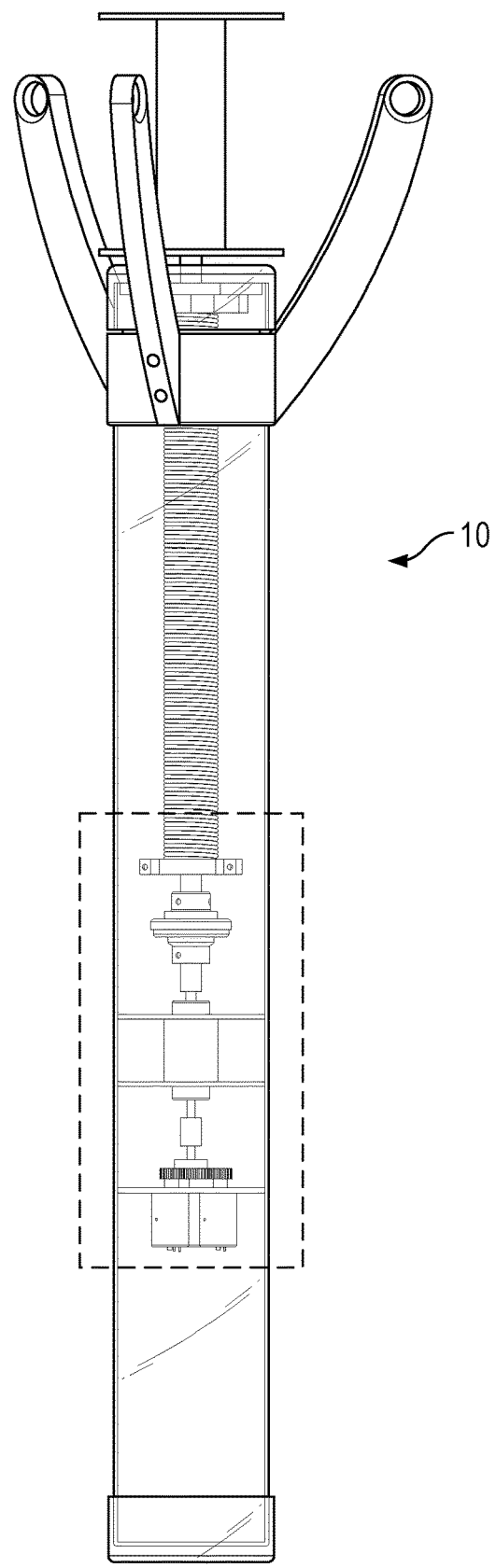
FIG. 19 is a schematic view of the arrangement of generator sets in accordance with one embodiment of the disclosure.
Figure 20:
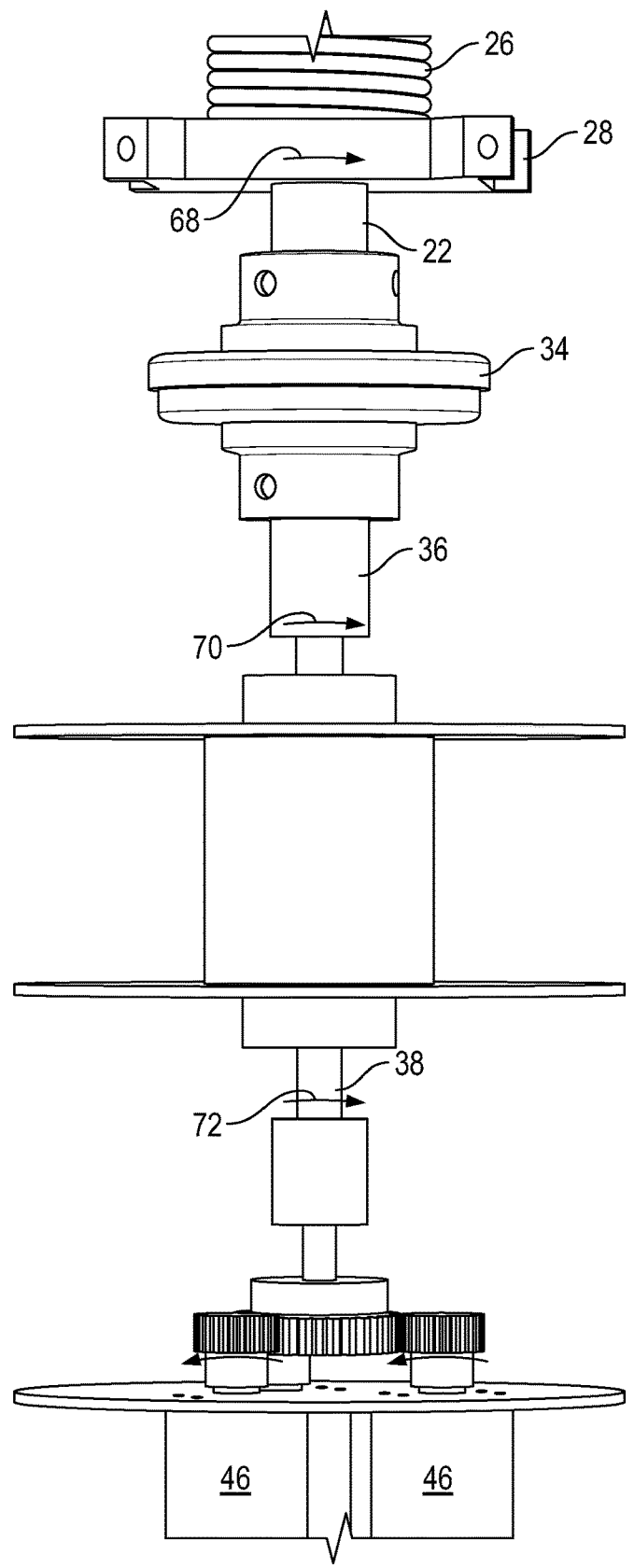
FIG. 20 is a schematic view of the operational functions of the drive system as the shaft drives the generator sets in accordance with one embodiment of the disclosure.
Figure 21:
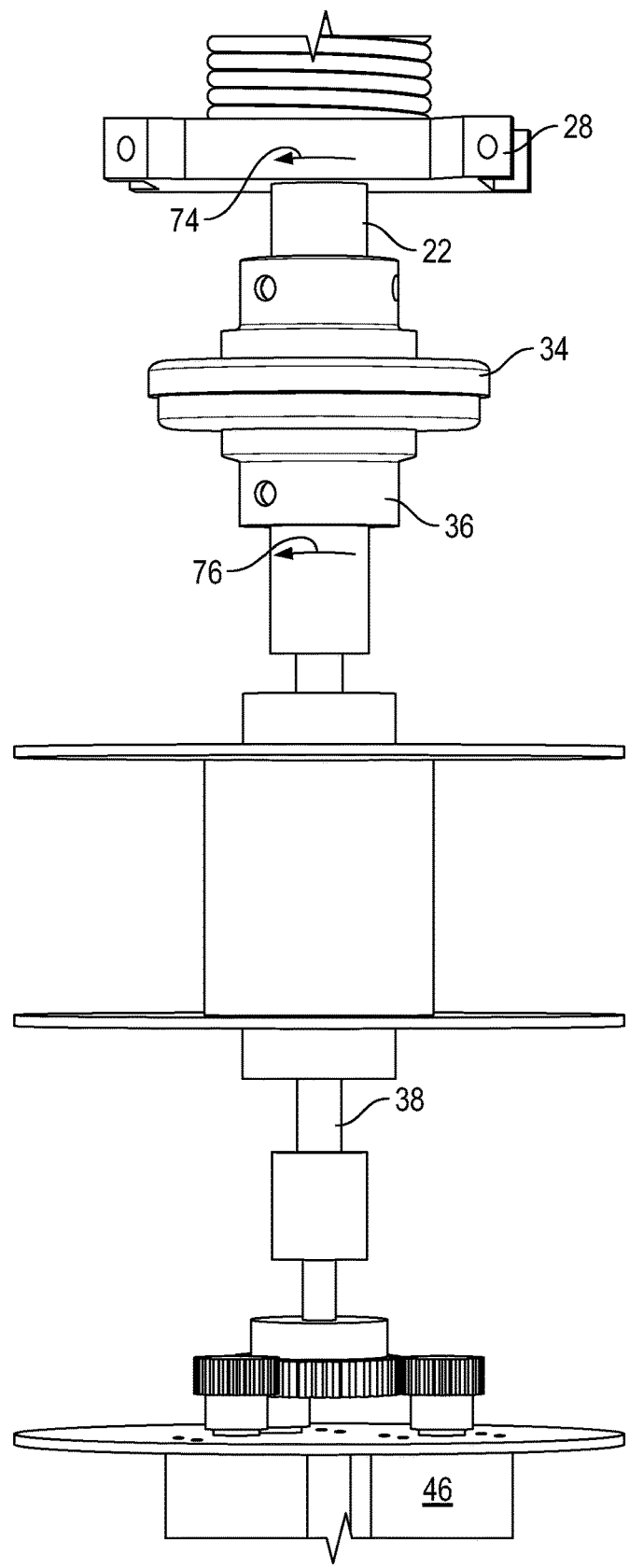
FIG. 21 is a schematic view of the operational functions of the drive system as the drive shaft returns to a reset position in accordance with one embodiment of the disclosure.

The relative motion of the generator components is illustrated during upward motion FIG. 20 and downward movement FIG. 21 of the buoy is best illustrated in FIG. 19-21. In FIG. 20, as the buoy pulls the cord first drive shaft 22 imparts rotational energy in a first direction 68 which is imparted to charge the torsion spring 26 and drive both the clutch 34 and the one directional bearing 36 which in turn imparts rotational force 70 into the second drive shaft 38 to transmit a driving force 72 into the generator set 46. In FIG. 21, as the buoy falls, and the cord goes slack the torsion spring 28 imparts a counter rotational force 74 causing first drive shaft 22 to counter rotate and rewind the cord 16 on the reel 20. The counter rotation is transmitted through the clutch 34 and the one directional bearing 36 prevents transmission of the counter rotational force 74 further into the second drive shaft 38 preventing transmission of a counter rotational driving force 76 into second drive shaft 28 the generator set 46.

It can therefore be seen that the invention has the potential to supply easily deployable, reliable, small amounts of power at sea or be scaled up to supply large amounts of reliable power at sea. It can be modified to work in any wave environment and at a large power range (0.1 kW to 10 kW). The modular nature of the design means that nearly anyone needing power at sea will benefit from it, regardless of the specifics of their demands.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A point absorber wave energy converter comprising:
   a housing having a longitudinal axis;
   a stabilizing system connected to a lower end of said housing;
   at least one generator within the housing;
   a first drive shaft mounted within the housing for bi-directional rotation on said longitudinal axis of said housing;
   a second drive shaft coaxial with said first drive shaft and mounted within the housing for single directional rotation around said longitudinal axis, said second driveshaft rotationally coupled to said at least one generator;
   a one-way coupler between said first drive shaft and said second drive shaft;
   a torsion spring arranged around the first drive shaft;
   a rotary pull drive on said housing, said pull drive including a reel secured to an upper end said first drive shaft for rotation thereof and a plurality of pull cords wrapped around said reel, said pull drive further comprising a cord guide system having a plurality of guide arms each extending outwardly and upwardly from said housing adjacent said reel and being equally circumferentially spaced around said longitudinal axis, each of said plurality of pull cords extending radially outwardly from said reel through a respective one of said plurality of guide arms; and
   a buoy secured at upper ends of said plurality of pull cords,
   wherein relative distancing movement of the buoy and the housing unwinds the pull cords, drives rotation of the first drive shaft and winds the torsion spring; and
   relative closing movement of the buoy allows the torsion spring to take up tension on the pull cords and rewind the plurality of pull cords on the reel.

2. The point absorber wave energy converter of claim 1:
   wherein said stabilizing system is selected from the group consisting of: a mooring system, a spar system, a ballast system, a tethered ballast system and combinations thereof.

3. The point absorber wave energy converter of claim 1, further comprising:
   a battery bank in electrical communication with said at least one generator.

4. The point absorber wave energy converter of claim 1, wherein said pull drive further comprises:
   three cords and said cord guide system comprises three equally circumferentially spaced guide arms.

5. The point absorber wave energy converter of claim 1, wherein said at least one generator further comprises:
   at least one generator set.

6. The point absorber wave energy converter of claim 5, wherein said at least one generator set further comprises:
   a plurality of generators mounted to a mounting plate, each of said generators having a drive gear engaged with a corresponding drive gear on said second drive shaft.

7. The point absorber wave energy converter of claim 5, wherein said at least one generator set further comprises:
   a plurality of generator sets, wherein each of said generator sets further includes a plurality of generators mounted to a mounting plate, each of said generators in said generator set having a drive gear engaged with a corresponding drive gear on said second drive shaft.

8. The point absorber wave energy converter of claim 1, wherein said one-way coupler is a one-way bearing assembly.

9. The point absorber wave energy converter of claim 1, further comprising:
   a gear set coupled between said second drive shaft and said at least one generator to increase a rotational speed of said at least one generator relative to a rotational speed of said second drive shaft.

10. The point absorber wave energy converter of claim 1, further comprising:
    flywheel coupled to said second drive shaft.

* * * * *